Dec. 13, 1960
J D FARMER
2,964,705
ELECTRICAL MEASURING APPARATUS HAVING
IMPROVED ELECTRONIC INVERTER CIRCUIT
Filed Feb. 13, 1957
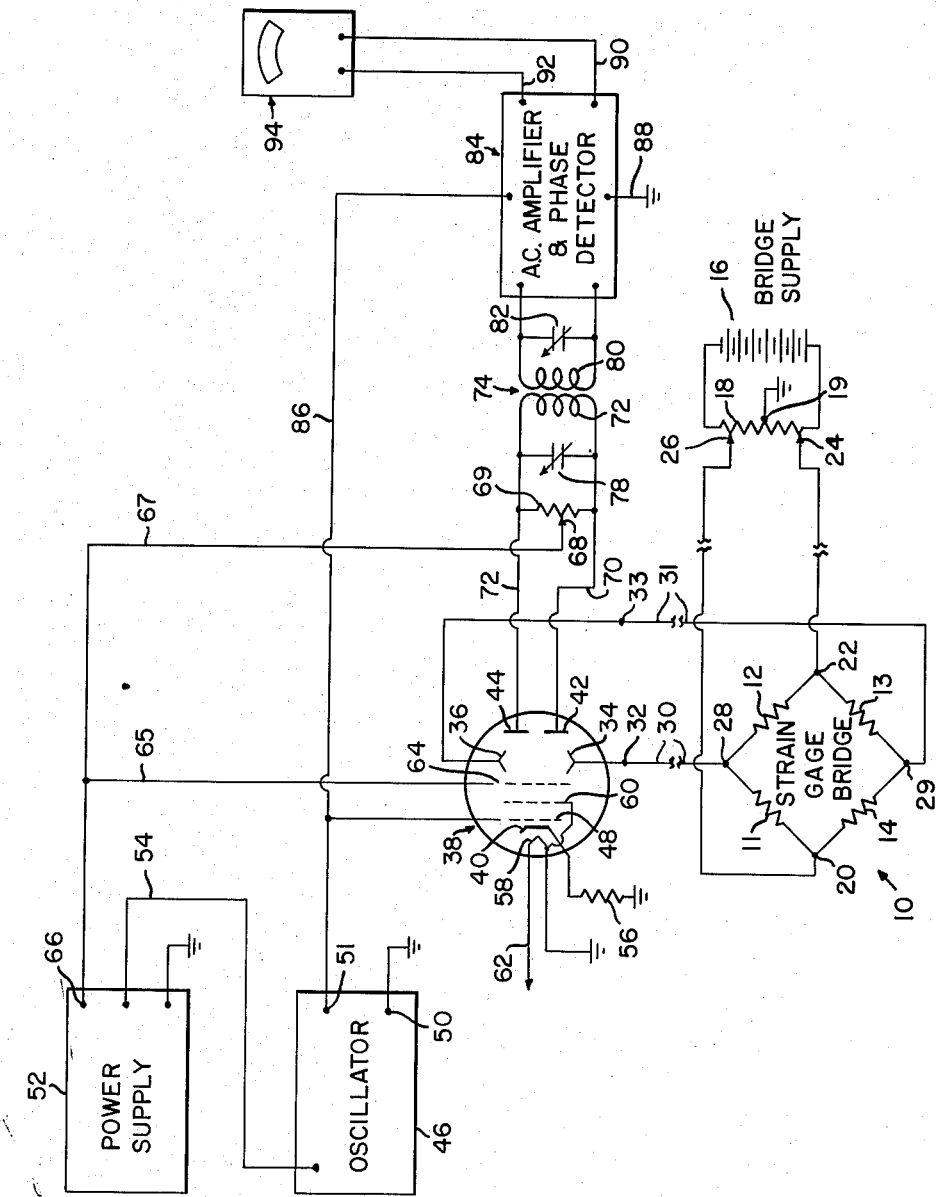
INVENTOR.
J D FARMER
BY
Curtis, Morris & Safford
ATTORNEYS United States Patent Office 2,964,705
Patented Dec. 13, 1960

2,964,705

ELECTRICAL MEASURING APPARATUS HAVING IMPROVED ELECTRONIC INVERTER CIRCUIT

J D Farmer, Marshall, Tex., assignor to Thiokol Chemical Corporation, Trenton, N.J., a corporation of Delaware Filed Feb. 13, 1957, Ser. No. 639,963

7 Claims. (Cl. 324—83)

The present invention relates to electrical measuring apparatus including an improved quick-response electronic inverter circuit and more particularly relates to an electrical measuring circuit having an improved electronic inverter circuit with a balanced direct-current input circuit and a balanced alternating-current output circuit. The illustrative embodiment of this invention includes a strain gage bridge sensing device producing a balanced direct current output, a sheet-beam type of vacuum tube inverter circuit directly connected to the output of the bridge sensing device and an alternating current amplifier output circuit coupled to the inverter circuit.

Many electrical measurements utilize sensing devices of the type producing a direct-current output which varies with the conditions under measurement. A difficult problem often is encountered in amplifying the D.-C. output from these sensing devices to a corresponding larger value such that the amplified output can then be utilized as desired. For example, it may be desired to utilize the amplified output to operate an indicating, recording, or controlling instrument, or a combination of such measurement instruments.

In certain instances it is possible to use amplifiers capable of directly amplifying the D.-C. output from these types of sensing devices. However, such direct current amplifiers are critical in their adjustments and stability requirements. They are usually extremely sensitive to changes in ambient conditions such as temperature and humidity, are unduly affected by aging of the electrical components and "drift" during operation. For these reasons it is usually far more desirable to invert the direct current output from the sensing device into an alternating current whose amplitude corresponds with the magnitude of the direct current. This alternating current is then readily amplified by a reliable A.-C. amplifier for operating the desired measurement instruments.

The electrical measuring apparatus described herein as an illustrative embodiment of the present invention utilizes an improved electronic inverter circuit including a sheet-beam type of vacuum tube providing many operating advantages over the various circuits of the prior art. Among these advantages are its accurate linearity in converting a varying D.-C. signal into an A.-C. signal having a correspondingly varying amplitude and its extremely quick action. Thus, abrupt and large changes in the condition being sensed are immediately and accurately reflected in the measurement output circuits.

Moreover, the inverter circuit is desirably sensitive in its response to very slight changes in magnitude of the D.-C. signal input so that very slight changes in the conditions being measured are properly indicated in the measurement output circuits.

In the illustrative embodiment of the present invention the output from opposite sides of a strain gage bridge circuit is connected directly to the two deflection plates of the sheet-beam vacuum tube. An alternating signal of fixed frequency suitable for amplification is applied to the control grid. As the direct-current output from the bridge varies, it changes the relative potentials of the two deflection plates. A corresponding change is produced in the relative amounts of the sheet beam of electrons striking the two anodes of the tube. And a balanced alternating current output signal is obtained which is amplified for use in the measurement output circuit.

As a result of these many advantageous operating characteristics, the illustrative embodiment of the present invention and other measuring circuits incorporating this invention enable precise, accurate measurements to be made under conditions wherein the inverter circuits of the prior art often yield incomplete or inaccurate results.

In this specification and in the accompanying drawing, is described and shown an embodiment of my invention in electrical measuring apparatus and various modifications thereof are indicated, but it is to be understood that these are not intended to be exhaustive nor limiting of the invention, but on the contrary are given for purposes of illustration in order that others skilled in the art may fully understand the invention and the manner of its application in practical use and so that they may modify and adapt the invention in various forms, each as may be best suited to the conditions of a particular use.

The various objects, aspects, and advantages of the present invention will be more fully understood from a consideration of the following specification in conjunction with the accompanying schematic circuit diagram of electrical measuring apparatus including a sheet-beam type vacuum tube inverter circuit and embodying the present invention.

Referring to the drawing in greater detail, a direct-current type sensing device, here illustrated as a strain gage bridge, generally indicated at 10, is being used to make the desired measurements. In this example, the bridge 10 is described as being used to sense the strains in an object under test, such as the flutter in an airplane wing. This circuit has many advantages for such measurements. It enables the elimination of any alternating currents from the vicinity of the object under test, thus desirably avoiding any possible influence upon or interaction with the object under test or upon any other circuits in the vicinity. Nevertheless, the inverter is so rapid and accurate in response that the engineers running the test are enabled to obtain the desired complete information, regardless of abrupt strain changes, either large or small, in the test object.

As indicated, the sensing device 10 may be located remotely from any other components of the measuring apparatus. The undesired stray capacitance effects of wiring position and lead dress are avoided by this direct-current sensing device in spite of the substantial lengths of the four wires running to the remote bridge.

The four strain-responsive resistance elements 11, 12, 13, and 14 of the bridge are secured, for example, by cementing, to the test object so as to respond to the strains therein. A direct current bridge energizing supply 16 is connected across a potentiometer 18 having a center tap 19 connected to the common return circuit of the instrument, as indicated by the "ground" connection.

The desired supply potential for the bridge is applied across a pair of energizing terminals 20 and 22. This supply potential is adjusted by sliding a pair of movable contacts 24 and 26 along opposite sides of the potentiometer. By proper adjustment of these contacts the supply potential of the bridge can be balanced with respect to the common ground connection of the measurement circuit when desired. A varying direct current potential difference appears across the bridge output terminals 28 and 29 which varies in accordance with variations in the strains in the test object. This varying D.-C. signal is fed back through the leads 30 and 31 and is applied to the input terminals 32 and 33 for the remainder of the measuring circuit. Assuming that the four resistance elements 11, 12, 13, and 14 are substantially equal in value, then, when the test object is placed under strain, the resulting change in resistance of the bridge arms causes a difference in potential to appear on the leads 30 and 31. This D.-C. output on the leads 30 and 31 is balanced with respect to the common or "ground" circuit of the apparatus. That is, the magnitude of the positive voltage on one lead is equal to the magnitude of the negative voltage on the other lead with respect to this ground circuit. When the test object is relieved of strain, the voltage on both leads 30 and 31 drops to zero.

In order to invert this D.-C. signal into a corresponding A.-C. signal the leads 30 and 31 are directly connected to the deflection plates 34 and 36, respectively, of a double-anode, sheet-beam type of vacuum tube 38, for example such as the 6AR8 commercially available from the General Electric Company. These deflection plates control the direction of a sheet-like beam of electrons which emanates from the cathode 40 and is normally directed so as to follow along a path normally passing mid-way between the two anodes 42 and 44. Thus, when the potentials on the two deflection plates 34 and 36 are equal, the relative amounts of the sheet-beam striking the two anodes 42 and 44 are equal. When the potentials on the two deflection plates are different, the electron beam is proportioned between the two anodes in accordance with this potential difference.

To provide an A.-C. output at the anodes 42 and 44 of a frequency convenient for amplification, the intensity of the electron beam is substantially sinusoidally varied by means of an oscillator 46 applying an alternating signal to the control grid 48 of this tube. The frequency of the oscillator 46 is 10,000 cycles per second for convenient amplification. However, any suitable excitation frequency may be used depending upon the application. As shown, one of the oscillator output terminals 50 is connected to the common ground circuit and the other terminal 51 is coupled to the control grid 48. A conventional power supply 52 energizes the oscillator through a lead 54. The cathode 40 is returned to ground through a cathode bias resistor 56 and is heated by a heater filament 58, one side of which is grounded and is connected to the suppressor grid 60. A suitable low voltage source of current is connected through a wire 62 to the heater filament.

The electron beam is controlled in shape and direction by focusing electrodes (not shown) within the tube and is accelerated by an accelerating grid 64 which receives a suitable direct positive voltage, for example such as 300 volts through a lead 65 from a terminal 66 of the power supply. Anode potential is obtained from this same terminal through a connection 67 to an adjustable balancing contact 68 on a resistor 69 having opposite ends connected through leads 70 and 72 to the anodes 42 and 44, respectively.

In operation, as the output from the bridge sensing device varies, a proportionate deflection of the electron beam occurs, thus proportionately increasing the A.-C. signal at one of the anodes while decreasing that at the other. Connected between the anode leads 70 and 72 is the primary winding 74 of an output transformer 76 with an adjustable tuning capacitor 78 in shunt forming a parallel resonant circuit which is tuned for maximum response at the oscillator frequency. The secondary 80 is similarly tuned by a capacitor 82 and is connected to the input terminals of an A.-C. amplifier and phase detector 84, shown schematically in block form.

By virtue of the adjustment of the movable contact 68, the output circuit including the primary 72 is also balanced with respect to ground. When the bridge output drops to zero no alternating signal appears across the primary 72. When the strain reverses in sign, that is changes from tension to compression, or vice versa, as the case may be, the phase of the A.-C. output signal applied to the primary 72 reverses, that is, changes by 180°. Thus, advantageously, the magnitude of the A.-C. output signal varies linearly with variations in the D.-C. output from the sensing device 10 and substantially instantaneously responds to variations in conditions at the sensing device. Reversals in strain are immediately inverted into reversals in phase of the A.-C. output.

In order to sense the direction of the phase of the A.-C. output signal being applied to the amplifier 84, the output from the terminal 51 of the oscillator is fed through a lead 86 into a phase detector and rectifier circuit included with the A.-C. amplifier 84. For example, this phase detector may be such as that disclosed in U.S. Patent No. 2,755,446, issued July 17, 1956. The circuit 84 is coupled to the common ground circuit by a lead 88.

Thus, a direct current is supplied from the output terminals of the circuit 84 through a pair of leads 90 and 92 whose magnitude and polarity accurately and sensitively correspond with the conditions being measured. This output is used to drive any suitable measurement instrument 94 as may be required by the type of test or control action desired to be obtained.

From the foregoing it will be understood that the electrical measuring apparatus including the electronic inverter described above is well suited to provide the advantages set forth, and since many possible embodiments may be made of the various features, it is to be understood that all matter hereinbefore set forth or shown in the accompanying drawings is to be interpreted as illustrative and that in certain instances, some of the features of the invention may be used without a corresponding use of other features, all without departing from the scope of the invention.

What is claimed is:

1. Improved electrical measuring apparatus comprising a sensing device producing a direct current output varying in response to a condition being sensed, an electronic inversion circuit including a sheet-beam vacuum tube having an electron-emitting cathode, a pair of anodes and a pair of deflection plates controlling the proportioning of the relative division between said anodes of the electron beam from said cathode, the direct current output from said sensing device being applied across said deflection plates, said tube including a control electrode controlling the intensity of said electron beam, an oscillator supplying alternating signals of fixed frequency to said control electrode, and an alternating-current output circuit coupled between said anodes and responsive to the relative division of the electron beam therebetween.

2. Improved electrical measuring apparatus comprising a sensing device producing a direct current output varying in response to a condition being sensed, an electronic inversion circuit including a sheet-beam vacuum tube having an electron-emitting cathode, a pair of anodes and a pair of deflection plates controlling the proportioning of the relative division of the electron beam from said cathode between said anodes, the direct current output from said sensing device being applied across said deflection plates, said tube including a control electrode controlling the intensity of said electron beam, an oscillator supplying alternating signals of fixed frequency to said control electrode, an output transformer having a primary winding coupled between said anodes, a resistor also connected between said anodes and having an adjustable center-tap thereon connected to a source of direct positive voltage, said cathode being returned effectively to the negative terminal of said positive voltage source, a secondary winding coupled to said primary winding, and an A.-C amplifier coupled to said secondary winding.

3. Improved electrical measuring apparatus comprising a strain gage sensing bridge having a pair of energizing terminals connected to a direct current supply source and a pair of output terminals producing a direct potential therebetween varying in response to a strain condition being sensed, an electronic inversion circuit including a sheet-beam vacuum tube having an electron-emitting cathode, a pair of anodes and a pair of deflection plates controlling the proportioning of the relative division of the electron beam from said cathode between said anodes, each of said deflection plates being directly connected to one of said bridge output terminals, said tube including a control electrode controlling the intensity of said electron beam, an oscillator supplying alternating signals of fixed frequency to said control electrode, and an alternating current output circuit coupled between said anodes and responsive to the relative division of the electron beam therebetween.

4. Improved electrical measuring apparatus comprising an electronic inversion circuit including a sheet-beam vacuum tube having a cathode, said tube including a control electrode controlling the intensity of the electrons leaving said cathode, an oscillator supplying alternating signals of fixed frequency to said control electrode, a pair of anodes and a pair of deflection plates controlling the relative division of the amounts of electrons from said cathode reaching each of said anodes, and thus controlling the relative amplitude and phase of the alternating signal at said anodes, a pair of input terminals for said measuring apparatus, each of said input terminals being directly connected to a one of said deflection plates, said input terminals being adapted to have a varying direct-current signal applied therebetween to control the relative magnitude and phase of the alternating output at said anodes, and an alternating current output circuit coupled between both of said anodes and responsive to the relative magnitude and phase of the A.-C. signal therebetween.

5. Improved electrical measuring apparatus adapted to utilize the output from a sensing device of the type producing a direct current varying in magnitude and direction in response to a condition being sensed, said apparatus including a pair of input terminals adapted to be connected in circuit with said sensing device, an electronic inverter circuit connected to said input terminals and including a sheet-beam vacuum tube having a cathode, a control grid for controlling the intensity of the electron beam flowing from said cathode and a pair of spaced electron-beam collecting anodes, an alternating current source coupled to said control grid, a pair of deflection plates positioned on opposite sides of the electron beam flowing toward said anodes, each of said plates being directly connected to one of said input terminals, and an output circuit coupled to each of said anodes including an alternating current amplifier and phase detector, and circuit means applying a signal from said alternating current source to said phase detector.

6. Improved electrical measuring apparatus adapted to utilize the output from a sensing device of the type producing a direct current varying in magnitude and direction in response to a condition being sensed, said apparatus including a pair of input terminals adapted to be connected in circuit with said sensing device, an electronic inverter circuit connected to said input terminals and including a sheet-beam vacuum tube having a cathode, a control grid for controlling the intensity of the electron beam flowing from said cathode and a pair of spaced electron-beam collecting anodes positioned near the path of the electron beam, means producing an alternating potential on said control grid, a pair of deflection plates positioned on opposite sides of the electron beam flowing toward said anodes, each of said plates being directly connected to one of said input terminals, and an output circuit coupled to each of said anodes including an alternating current amplifier and phase detector, and circuit means coupled from said control grid to said phase detector for controlling the operation of said amplifier and phase detector.

7. A balanced strain gage measuring system comprising a four-arm strain gage bridge having four terminals at the four corners thereof, a direct current supply source which is balanced with respect to ground potential connected to a first pair of said terminals at opposite corners of the bridge, a balanced inversion circuit connected to the second pair of terminals, said inversion circuit including a sheet-beam vacuum tube having an electron-emitting cathode, a control grid for controlling the intensity of the electron beam flowing from said cathode, a pair of spaced electron-beam collecting anodes, an accelerating electrode between said cathode and said anodes, a pair of deflection electrodes positioned on opposite sides of the electron beam flowing toward said anodes, a pair of direct connections, each connection extending from a respective one of said second pair of bridge terminals to a respective one of said deflection electrodes, an oscillator supplying alternating signals of fixed frequency to said control grid, an output transformer having a primary winding connected between said anodes, a resistor connected between said anodes and having an adjustable center tap thereon, a first capacitor shunted across said primary winding and resonant therewith at said frequency, direct voltage source means connected to said adjustable center tap and to said accelerating electrode, the secondary of said transformer having a second capacitor shunted thereacross and resonant therewith at said frequency, and an alternating current amplifier and phase detector connected to said secondary and to said oscillator.

References Cited in the file of this patent

UNITED STATES PATENTS

| | | |
|---|---|---|
| 1,257,971 | Bethenod | Mar. 5, 1918 |
| 2,354,130 | Langer | July 18, 1944 |
| 2,361,274 | Cravath | Oct. 24, 1944 |
| 2,414,102 | Hull | Jan. 14, 1947 |
| 2,505,072 | Sunstein | Apr. 25, 1950 |
| 2,544,400 | Sourwine | Mar. 6, 1951 |
| 2,594,428 | Hall | Apr. 29, 1952 |
| 2,658,819 | Formwalt | Nov. 10, 1953 |
| 2,685,665 | Price | Aug. 3, 1954 |
| 2,744,222 | Toomin | May 1, 1956 |
| 2,830,265 | Ellison | Apr. 8, 1958 |